(12) United States Patent
Patil et al.

(10) Patent No.: US 10,404,812 B2
(45) Date of Patent: Sep. 3, 2019

(54) METHOD AND APPARATUS FOR PROVIDING A PERSISTENT USB SERVICE FOR WIRELESS USB DEVICES

(71) Applicant: Samsung Electronics Co., Ltd., Gyeonggi-do (KR)

(72) Inventors: Mayuresh Madhukar Patil, Bangalore (IN); Jong-Hyo Lee, Gyeonggi-do (KR); Karthik Srinivasa Gopalan, Bangalore (IN)

(73) Assignee: Samsung Electronics Co., Ltd (KR)

( * ) Notice: Subject to any disclaimer, the term of this patent is extended or adjusted under 35 U.S.C. 154(b) by 238 days.

(21) Appl. No.: 14/913,588

(22) PCT Filed: Aug. 21, 2014

(86) PCT No.: PCT/KR2014/007779
§ 371 (c)(1),
(2) Date: Feb. 22, 2016

(87) PCT Pub. No.: WO2015/026179
PCT Pub. Date: Feb. 26, 2015

(65) Prior Publication Data
US 2016/0212226 A1    Jul. 21, 2016

(30) Foreign Application Priority Data

Aug. 21, 2013  (IN) ........................... 3688/CHE/2013
Jul. 4, 2014   (IN) ........................... 3688/CHE/2013

(51) Int. Cl.
*H04L 29/08* (2006.01)
*G06F 13/38* (2006.01)
(Continued)

(52) U.S. Cl.
CPC ............ *H04L 67/16* (2013.01); *G06F 13/385* (2013.01); *H04L 67/1046* (2013.01);
(Continued)

(58) Field of Classification Search
CPC .. G06F 1/1632; G06F 13/385; G06F 13/4081; G06F 13/4282; H04L 41/0809;
(Continued)

(56) References Cited

U.S. PATENT DOCUMENTS

2006/0149858 A1   7/2006  Bhesania et al.
2008/0301351 A1  12/2008  Lee
(Continued)

FOREIGN PATENT DOCUMENTS

CN   101321167   12/2008
CN   101354691    1/2009
(Continued)

OTHER PUBLICATIONS

PCT/ISA/210 Search Report issued on PCT/KR2014/007779 (pp. 3).
European Search Report dated Mar. 21, 2017 issued in counterpart application No. 14837950.6-1853, 5 pages.
Chinese Office Action dated Apr. 11, 2018 issued in counterpart application No. 201480046527.6, 12 pages.

*Primary Examiner* — Christopher Biagini
(74) *Attorney, Agent, or Firm* — The Farrell Law Firm, P.C.

(57) ABSTRACT

A method and apparatus for providing service persistence support and corresponding mapping with the P2P group persistence behavior between a WSB host and a WSB client is described. The method includes receiving a request for a persistent P2P USB connection from the WSB host. The method includes creating a group with the WSB client. Further, the method includes configuring a service identifier associated with the persistent P2P USB connection. Furthermore, the method includes mapping the created persistent P2P group with the service identifier. The method includes storing the service identifier mapped with the created persistent P2P group and the persistent P2P USB connection. The method allows the WSB client to provide the persistent USB service to the WSB host.

20 Claims, 3 Drawing Sheets

(51) Int. Cl.
*H04W 76/11* (2018.01)
*H04W 80/12* (2009.01)

(52) U.S. Cl.
CPC ......... *H04L 67/1063* (2013.01); *H04W 76/11* (2018.02); *H04W 80/12* (2013.01)

(58) Field of Classification Search
CPC ....... H04L 41/12; H04L 67/10; H04L 67/104; H04L 67/1046; H04L 67/1063; H04L 67/1068; H04L 67/141; H04L 67/16; H04L 69/329; H04W 28/18; H04W 76/02; H04W 76/021; H04W 76/023; H04W 8/005; H04W 80/12; H04W 84/12; H04W 84/20
See application file for complete search history.

(56) References Cited

U.S. PATENT DOCUMENTS

| | | | |
|---|---|---|---|
| 2009/0031061 A1 | 1/2009 | Lee | |
| 2009/0089476 A1 | 4/2009 | Oh et al. | |
| 2014/0334464 A1* | 11/2014 | Qi | H04W 4/08 370/338 |
| 2014/0337544 A1* | 11/2014 | Huang | G06F 13/385 710/63 |

FOREIGN PATENT DOCUMENTS

| | | |
|---|---|---|
| CN | 101375260 | 2/2009 |
| EP | 1 940 080 | 7/2008 |
| KR | 1020080020788 | 3/2008 |

\* cited by examiner

[Fig. 1]
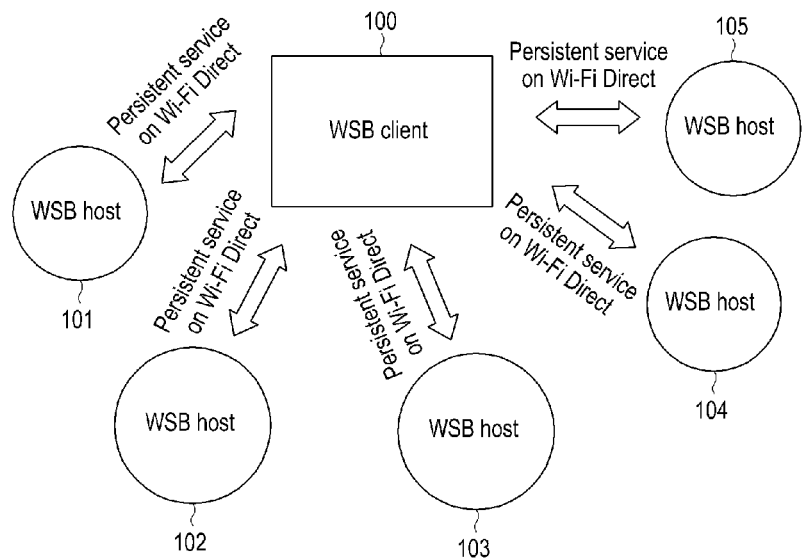
[Fig. 2]
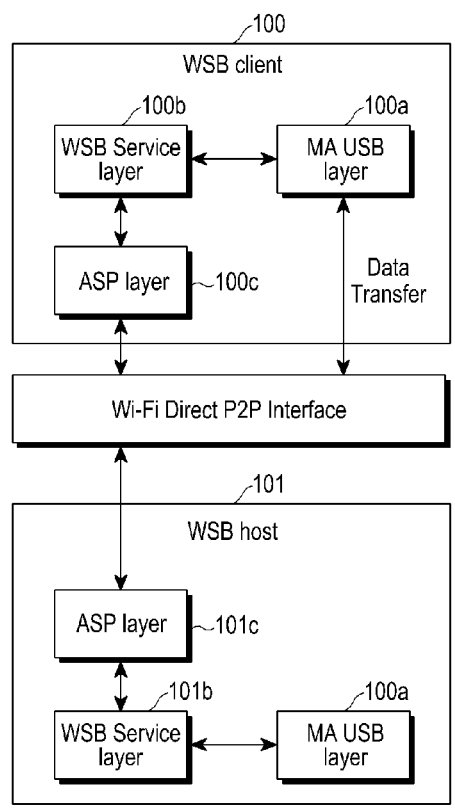

[Fig. 3]
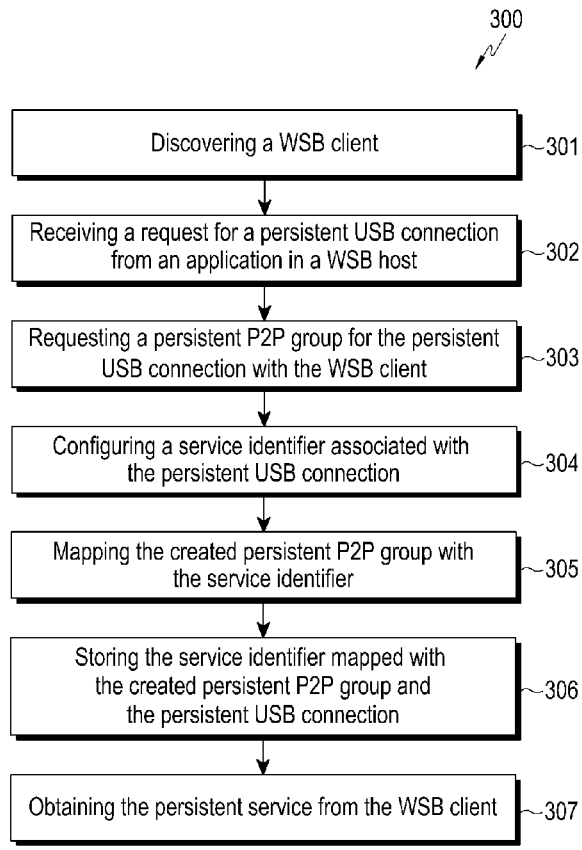
[Fig. 4]
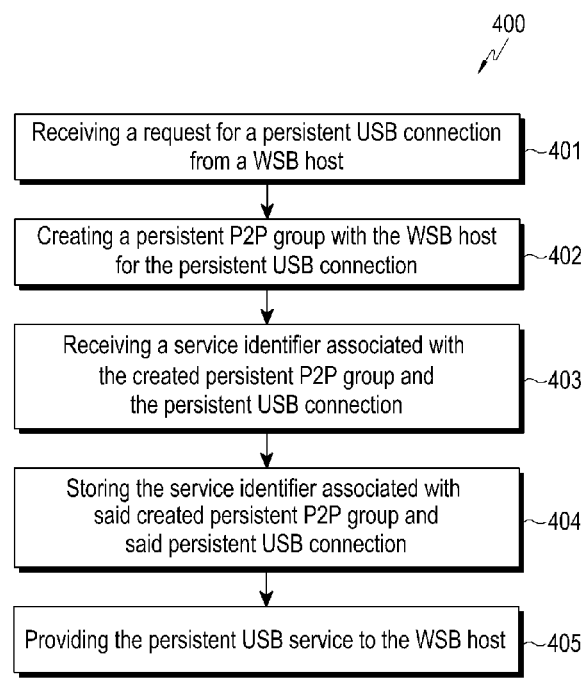

[Fig. 5]
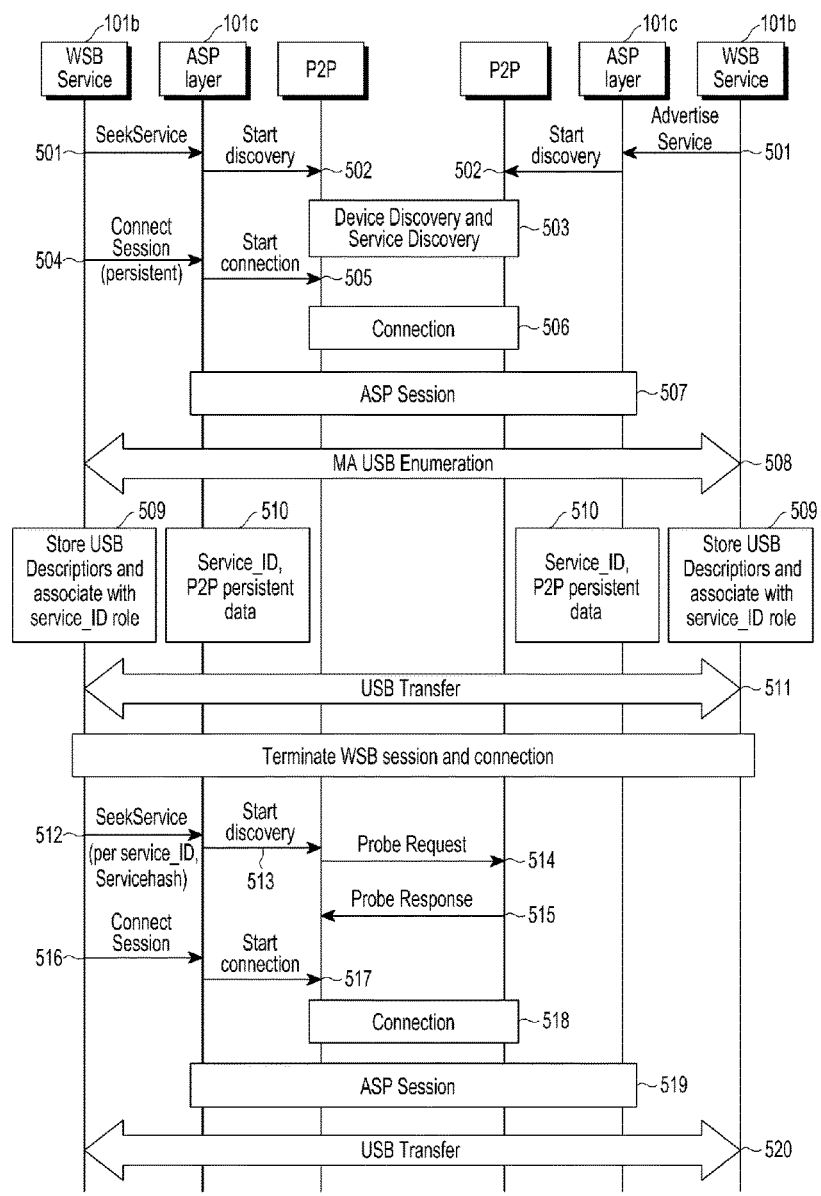
[Fig. 6]
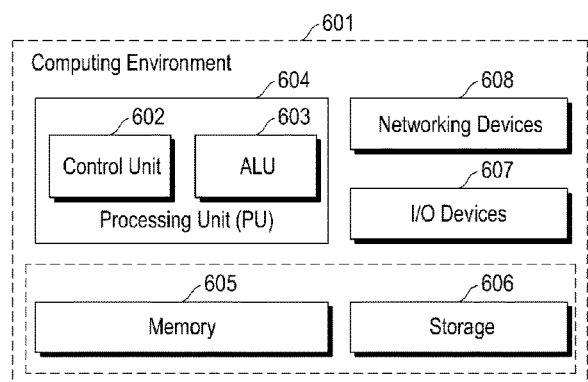

METHOD AND APPARATUS FOR PROVIDING A PERSISTENT USB SERVICE FOR WIRELESS USB DEVICES

PRIORITY

This application is a National Phase Entry of PCT International Application No. PCT/KR2014/007779, which was filed on Aug. 21, 2014, and claims priority to Indian Provisional Patent Application No. 3688/CHE/2013, which was filed on Aug. 21, 2013, and Indian Complete Patent Application No. 3688/CHE/2013, which was filed on Jul. 4, 2014, the contents of each of which are incorporated herein by reference.

TECHNICAL FIELD

The present invention relates to Wireless Fidelity (Wi-Fi) communication and more particularly relates to a method and apparatus for providing a persistent Universal Serial Bus (USB) service for wireless USB devices.

BACKGROUND ART

Communication devices and other computing devices (for example, personal computers, mobile telephones, electronic handheld devices, gaming consoles, or other similar devices) may communicate with a variety of periphery devices using communication standard. One such communication standard includes a Universal Serial Bus (USB) connection. Some examples of peripheral devices that may use a USB connection include keyboards, digital cameras, printers, personal media players, mass storage devices such as flash drives, network adapters, and external hard drives. For many of those devices, USB has become a very common communication standard that facilitates peripheral device connection.

USB devices generally operate using a standard protocol or interface, such as the interface set by a group of companies that developed a USB specification. USB devices may communicate with the host devices (for example, computers) utilizing an operating system without the need to install additional drivers or software onto the computer provided the instructions or requests used by the USB device are supported by the drivers resident on the host.

The USB devices can connect to a host device (for example, computers) either through a wired connection or through a wireless connection. The USB devices can connect to the host device wirelessly through communication channels. The communication channels may include relatively short-range communication channels, similar to Wi-Fi, Bluetooth, or the like.

A Wireless Serial Bus (WSB) is a Protocol Abstraction Layer (PAL) entity for running USB over Wi-Fi and handles the Wi-Fi related aspects of creating a USB connection such as discovery of USB devices managing the power and management of the connection. A Media Agnostic USB (MA-USB) is an entity that defines support to all USB transfer types like Bulk, interrupt, Isochronous and Control transfers and enumeration of USB devices. The MA-USB relies on medium specific PAL like WSB for the set up and handling of the underlying medium connectivity. The WSB and MA USB layers support client and Host roles. An Application Service Protocol (ASP) provides a framework for initiating and controlling a Wi-Fi direct P2P connection. The ASP supports deployment of services on the wireless medium. WSB can be deployed as a service on ASP. The primary steps involved in establishing a USB session over the wireless medium are as described herein. The WSB entity initiates the search for the peer WSB entity that may be a WSB host or a WSB client function. The underlying ASP layer initiates the discovery process. Once the counterpart entity (either WSB host or the WSB client) has been discovered and if needed, a pre association service discovery has been performed, the association and wireless connection between the two devices is established. When the connection between the two devices (WSB host and the WSB client) is established, the enumeration of the client device by the host device is performed by the MA USB host layer. This is followed by the configuration of the endpoints on the device that enables the device to be ready for data transfer.

Presently, Wi-Fi alliance has defined the Application Service Platform which allows services to advertise on its own and these services are discoverable over the air. In the existing system, the service discovery is mandatory and needs to be performed on all the USB device classes. The existing system allows adding the multiple hash values in case the device support multiple services. The service hash values are of 6 bytes in size.

Further, each individual service advertise itself to ASP (using the AdvertiseService primitive) with the full reverse DNS service name. A seeker device (WSB host) can seek a service using the SeekService primitive which includes the requested service name to be search on the air. The SeekService primitive triggers a Probe Request message which includes the service hash attribute. The ASP calculates the service hash for the service name using the 256 SHA 1 algorithm. In the Probe Request, only first six bytes will be sent over the air.

When the recipient device (WSB client) receives Probe Request, the WSB client matches the received hash with the registered services. Once the service hash is matched, a Probe Response is sent to the seeker device (WSB host). The Probe Response includes the matched full service name. Once the seeker (WSB host) receives the probe response (where the device discovery completes a7nd seeker device identifies the device and supported service), the seeker device needs to do service discovery with the all the searched devices in order to find out the detail information about the service. The seeker sends the Service discovery GAS request to request the details of the service and the WSB host replies with GAS response. The GAS response includes the details of the services for example, for send service it is role of the devices transmitter or receiver, serviced version number and so on.

In the existing system, when data transfer is ongoing between the WSB hose and the WSB client, the wireless connection may undergo transient connection losses. When the connection loss is experienced between the WSB host and the WSB client during the data transfer, the USB connection is torn down between the WSB host and the WSB client. The WSB host and the WSB client discover each other and a reenumeration of the WSB client is performed by the WSB host (and the configuration of endpoints) for continuation of data transfer, which is a timing consuming process. Further, a user may be frequently connecting to his/her peripheral devices wirelessly, which requires persistence behavior in the Wi-Fi service connection. In the existing system, the service discovery is mandatory and needs to be performed on all the USB device classes after discovering the device (for example, a USB peripheral). In the existing system, ASP (Wi-Fi P2P) architecture provides the P2P group level persistence, and it does not provide the service level persistence.

DISCLOSURE OF INVENTION

Technical Problem

Aspects of the present disclosure are to address at least the above-mentioned problems and/or disadvantages and to provide at least the advantages described below. Accordingly, the aspect of the present disclosure herein is to provide a method and apparatus for providing a persistent Universal Serial Bus (USB) service for wireless USB devices.

Another aspect of the present disclosure is to provide a method for configuring a Wireless Serial Bus (WSB) host for obtaining the persistent USB service from a WSB client.

Another aspect of the present disclosure is to provide a method and apparatus to provide service persistence support and corresponding mapping with the P2P group persistence behavior.

Another aspect of the present disclosure is to provide a method for configuring the WSB client for providing the persistent USB service to the WSB host.

Solution to Problem

Accordingly, the present disclosure provides a method for configuring a Wireless Serial Bus (WSB) host for obtaining a persistent Universal Serial Bus (USB) service from a WSB client, wherein the method comprises discovering the WSB client by an Application Service Protocol (ASP) layer in the WSB host. The method comprises receiving a request for a persistent USB connection with the WSB client from an application in the WSB Host. The method comprises requesting a persistent P2P group for the persistent USB connection with the WSB client by the ASP layer, wherein the ASP layer initiates the persistent USB connection by creating the persistent P2P group between the WSB host and the WSB client. Further, the method comprises mapping of the created persistent P2P group with a USB service by assigning a service identifier to the persistent USB connection and mapping the service identifier to the created P2P group by the ASP layer. Further, the method comprises obtaining the persistent USB service from the WSB client after storing the service identifier mapped with the created persistent P2P group and the persistent USB connection.

Accordingly, the present disclosure provides a method for configuring Wireless Serial Bus (WSB) client for providing a persistent Universal Serial Bus (USB) service to a WSB host, wherein the method comprises receiving a request for a persistent USB connection from the WSB host. Further, the method comprises creating a persistent P2P group for the persistent USB connection with the WSB host initiated by an Application Service Platform (ASP) layer. The method further comprises receiving a service identifier associated with the persistent USB connection and the created P2P group from the WSB host. Further, the method comprises storing the service identifier associated with the created persistent P2P group and the persistent P2P USB connection. Further, the method comprises providing the persistent USB service to the WSB host.

Accordingly, the present disclosure provides a WSB host for obtaining a persistent Universal Serial Bus (USB) service from a WSB client, wherein the WSB host comprises a Media Agnostic USB (MA USB) layer, a WSB layer and an Application Service Platform (ASP) layer along with an integrated circuit. Further the integrated circuit comprises at least one processor and at least one memory. The memory comprises a computer program code within the integrated circuit. At least one memory and the computer program code with the at least one processor cause the WSB host to discover the WSB client by an Application Service Protocol (ASP) layer in the WSB host. Further, the WSB host is configured to receive a request for a persistent USB connection with the WSB client from an application in the WSB host. Further, the WSB host is configured to request a persistent P2P group for the persistent USB connection with the WSB client by the ASP layer, wherein the ASP layer initiates the persistent USB connection by creating the persistent P2P group between the WSB host and the WSB client. The WSB host is further configured to map the created persistent P2P group with a USB service by assigning a service identifier to the persistent USB connection and mapping the service identifier to the created P2P group by the ASP layer. Further, the WSB host is configured to obtain the persistent USB service from the WSB client after storing the service identifier mapped with the created persistent P2P group and the persistent USB connection.

Accordingly, the present disclosure provides a WSB client for providing a persistent Universal Serial Bus (USB) service to a WSB host, wherein the WSB client comprises a Media Agnostic USB (MA USB) layer, a WSB layer and an Application Service Platform (ASP) layer along with an integrated circuit. Further the integrated circuit comprises at least one processor and at least one memory. The memory comprises a computer program code within the integrated circuit. At least one memory and the computer program code with the at least one processor cause the WSB client to receive a request for a persistent USB connection from the WSB host. The WSB client is further configured to create a persistent P2P group for the persistent USB connection with the WSB host initiated by an Application Service Platform (ASP) layer. Further, the WSB client is configured to receive a service identifier associated with the persistent USB connection and the created P2P group from the WSB host. The WSB client is configured to store the service identifier associated with the created persistent P2P group and the persistent P2P USB connection. The WSB client is further configured to provide the persistent USB service to the WSB host.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The present disclosure is illustrated in the accompanying drawings, throughout which like reference letters indicate corresponding parts in the various figures. The embodiments herein will be better understood from the following description with reference to the drawings, in which:

FIG. 1 illustrates a high level overview of a system in which a plurality of WSB hosts communicate with a WSB client, according to embodiments as disclosed herein;

FIG. 2 illustrates protocol layers within the WSB client and the WSB host, according to the embodiments as disclosed herein FIG. 3 is a flow diagram explaining a method for configuring the WSB host for obtaining a persistent USB service from the WSB client, according to the embodiments as disclosed herein;

FIG. 4 is a flow diagram explaining a method for configuring the WSB client for providing the persistent USB service to the WSB host, according to the embodiments as disclosed herein;

FIG. 5 is a sequence diagram in which the WSB host provides a persistent service to the WSB client, according to the embodiments as disclosed herein; and FIG. 6 illustrates a computing environment implementing the method for configuring the WSB host and the WSB client for providing the persistent USB service, according to the embodiments as disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method for apparatus for providing service persistence support and corresponding mapping with the P2P group persistence behavior between a WSB host and a WSB client. The method includes receiving a request for a persistent P2P USB connection from the WSB host. The method includes creating a persistent P2P group with the WSB client.

In an embodiment, a unique identifier is associated for the created persistent P2P group. There can be one or more WSB hosts in the created persistent P2P group. Further, the method includes configuring a service identifier associated with the persistent P2P USB connection. Furthermore, the method includes mapping the created persistent P2P group with the service identifier. The method includes storing the service identifier mapped with the created persistent P2P group and the persistent P2P USB connection. The method allows the WSB host and the WSB client to store the service identifier mapped with the created persistent P2P group and the persistent P2P USB connection. Further, the method allows the WSB client to provide the persistent USB service to the WSB host after storing the service identifier mapped with the created persistent P2P group and the persistent P2P USB connection.

Unlike the conventional system, the disclosed method provides an efficient mechanism (that ignores the service discovery procedure) for connecting to the frequently connected USB devices. Further, with the disclosed method and system, the number of messages that are exchanged over the air interface is reduced.

Referring now to the drawings and more particularly to FIGS. 1 through 6 where similar reference characters denote corresponding features consistently throughout the figures, there are shown preferred embodiments.

FIG. 1 illustrates a high level overview of a system in which a plurality of WSB hosts communicate with a WSB client, according to embodiments as disclosed herein. As depicted in FIG. 1, the architecture comprises the WSB client 100 and a plurality of WSB hosts 101, 102, 103, 104 and 105 which are connected wirelessly to the WSB client 100. There can be many more WSB hosts for the WSB client 100 (even though it is not shown in the figure). The plurality of WSB hosts ((101-105), as shown in the figure)) communicate with the WSB client through communication channels.

Communication channels generally represent any suitable communication medium, or collection of different communication media, for transmitting data between the WSB hosts and the WSB client, as shown in FIG. 1. The Communication channels may include relatively short-range communication channels, similar to Wi-Fi, Bluetooth, or the like. However, communication channels are not necessarily limited in this respect, and may comprise any wireless or wired communication medium, such as a radio frequency (RF) spectrum or one or more physical transmission lines, or any combination of wireless and wired media.

The WSB hosts (101-105) of FIG. 1 may communicate with the WSB client 100 over communication channels using a communications protocol such as a standard from the IEEE 1402.11 family of standards, or any other communication protocol or format. The WSB client and the WSB hosts (101-105) of FIG. 1 may communicate, for example, according to the Wi-Fi Direct or Wi-Fi Display (WFD) standards, such that the WSB client 100 and the WSB hosts (101-105) communicate directly with one another without the use of an intermediary such as wireless access points.

The WSB client 100 includes an electronic device capable of communicating with one or more devices, such as WSB hub (not shown in figure) and the WSB client devices (101-105). Further, the WSB host 100 may include a Smartphone, tablet, or a mobile device. With respect to mobile devices such as smart phones and tablets, the WSB host 100 may include any electronic device capable of communicating with one or more other devices (WSB clients (101-105)), and may be integrated, for example, into appliances, automobiles, aircraft, watercraft or any other device capable of performing the data transfer capabilities.

The WSB client 100 or the WSB hosts (101-105) may be implemented as one or more microprocessors, digital signal processors (DSPs), application specific integrated circuits (ASICs), field programmable gate arrays (FPGAs), discreet logic, software, hardware, firmware or any combinations thereof.

A connection (for example, a Wi-Fi Direct connection) between the WSB client 100 and the WSB host 101 is performed largely through three processes including a device discovery, a service discovery, and group establishment (or group generation).

In an embodiment, the WSB host 101 sends a request for a persistent USB connection to the WSB client 100. Further, the WSB host 101 requests for a persistent group with the WSB client 100 while initiating the persistent USB connection. Further, the WSB host 100 sends a PD request to initiate a service request. In an embodiment, the PD request includes the persistent connection request. Further, the WSB host 101 generates a unique service identifier (Service_ID) associated with the persistent USB connection.

When the connection is established between the WSB host 101 and the WSB client 100, the WSB host 101 and the WSB client 100 store the service identifier associated with the created persistent P2P group and the persistent USB connection.

In an embodiment, the WSB client 100 and the WSB host 101 store all the USB information, for example, all the descriptors and the Service_ID associated with it.

In order to continue to the existing connection or the session with the WSB client 100, the WSB host 101 sends the service ID along with a group identifier (which indicates the P2P group created between the WSB host 101 and the WSB client 100) for obtaining the persistent USB service from the WSB client 101.

FIG. 2 illustrates protocol layers within the WSB host and the WSB client, according to the embodiments as disclosed herein. The WSB specification defines architecture and a set of protocols to perform WSB device/service discovery and connection setup between two peer WSB devices, Wi-Fi specific configurations on a WSB device, and the method of utilizing the Media Agnostic USB (MA USB) protocol for USB data transfers. As depicted in the figure, the WSB client 100 comprises a MA-USB layer 100a, a WSB layer 100b and an ASP layer 100c. The WSB host 101 comprises a MA-USB layer 101a, a WSB layer 101b and an ASP layer 101c.

The set of protocols defined in the specification is referred to as the WSB layer or the WSB Service, which is deployed as a Service over the Wi-Fi Direct Services (WFDS) on the Application Service Platform (ASP).

The WSB layer or WSB Service (which is present on the WSB client 100 and the WSB host 101) performs WSB device/service discovery to enable a WSB device (WSB host or a WSB client) to identify a peer WSB device and its service attributes. After the WSB device/service discovery, the WSB Host 101 and the WSB client 100 can connect to each other by setting up an ASP session. After the connection setup, the MA USB protocol layer is used to perform the USB device enumeration and USB data transfers.

In an embodiment, the WSB service layer 100b and 101b store the service identifier mapped with the created persistent P2P group and the persistent USB connection.

In an embodiment, the ASP layer 100c and 101c The ASP layers (101c and 100c) on the WSB client 100 and the WSB host 101 maintain the service_ID along with the information of the created P2P persistent group.

FIG. 3 is a flow diagram explaining a method for configuring the WSB host for obtaining a persistent USB service from the WSB client, according to the embodiments as disclosed herein. Initially, at step 301, the method 300 includes discovering the WSB client 100 by the ASP layer 101c in the WSB host 101.

At step 302, the method 300 includes receiving a request for the persistent USB connection with the discovered WSB client 100 from an application in the WSB host 101 by the WSB service layer 101b. In an embodiment, the WSB service layer 101b (in the WSB client 100) requests the persistent USB connection using an existing primitive ConnectSession(persistent) or with a newly defined primitive ConnectPersistentSession( ) for initiating the persistent USB connection with the WSB client 100.

At step 303, the method includes requesting a persistent P2P group for the persistent USB connection with the WSB client 100 by the ASP layer 101c in the WSB host. In an embodiment, the ASP layer 101c initiates the persistent USB connection by creating the persistent P2P group with the WSB client 100. In an embodiment, the ASP layer 101c in the WSB host 101 assigns a unique identifier for the created persistent P2P group between the WSB host 101 and the WSB client 100. In an embodiment, there exist one or more WSB hosts in the created persistent P2P group.

At step 304, the method 300 includes configuring a service identifier (Service_ID) associated with the persistent USB connection by the ASP layer 101c in the WSB host 101. At step 305, the method 300 includes mapping the created persistent P2P group with the service identifier by the ASP layer 101c in the WSB host.

At step 306, the method 300 includes storing the service identifier mapped with the created persistent P2P group and the persistent USB connection by the WSB service layer 101b in the WSB host 100.

At step 307, the method 300 includes obtaining the persistence USB service from the WSB client 100.

Further, the method for discovering the persistent USB service is as detailed herein. In an embodiment, the WSB host 101 sends a probe request that includes the service identifier and the information of the created persistent P2P group to the WSB client 100. Further, the WSB client 100 performs a search for determining the received service identifier and the created persistent P2P group information from the WSB host 101 with the stored service identifier and the created group information. When the stored service identifier and the group information (for example, group identifier) are matched with the service identifier and the group identifier in the probe request, the WSB client 100 generates a probe response to the WSB host 101 for indicating the availability of the persistent USB service.

Further, the various actions, units, steps, blocks, or acts described in the method 300 can be performed in the order presented, in a different order, simultaneously, or a combination thereof. Furthermore, in some embodiments, some of the actions, units, steps, blocks, or acts listed in the FIG. 3 may be omitted.

FIG. 4 is a flow diagram explaining a method for configuring the WSB client for providing the persistent USB service to the WSB host, according to the embodiments as disclosed herein. At step 401, the method 400 includes receiving the request for the persistent USB connection from the WSB host 101 by the ASP layer 100c in the WSB client 100. When the ASP layer 100c receives the request for the persistent USB connection with the WSB host 101, the ASP layer 100c initiates the P2P USB connection between the WSB host 101 and the WSB client 100 through P2P interface on the WSB client 100.

At step 402, the method 400 includes creating the persistent P2P group between the WSB client 100 and the WSB host 101 by the ASP layer 100c on the WSB client 100 for initiating the persistent USB connection.

Further, the ASP layer 101c sends a Probe Discovery (PD) request to initiate the service request. In an embodiment, the PD request includes the persistent connection request. Further, the ASP layer on the WSB client 100 generates a unique Service_ID associated with the persistent P2P connection. The ASP layer 100c allows the WSB client 100 to establish connection with the WSB host 101.

When the connection is established between the WSB host 101 and the WSB client 100, the ASP layer 100c on the WSB client 100 sends a ConnectStatus event to the WSB service 100b. The ConnectStatus event includes the service identifier.

At step 403, the method 400 includes receiving the service identifier associated with the created persistent P2P group and the persistent USB connection by the WSB service layer 100b.

At step 404, the method 400 includes storing the service identifier associated with the created persistent P2P group and the persistent P2P USB connection by the WSB service layer 100b.

In an embodiment, the WSB service 100*b* on the WSB client stores all the USB information, for example, all the descriptors and also Service_ID associated with it.

In an embodiment, the WSB service 100*b* on the WSB client 100 informs the MA-USB stack to maintain the USB descriptors and USB address which will be associated after the USB enumeration process. Thus, the WSB service layer 100*b* on the WSB client 100 stores all the descriptors and the service identifier associated with it.

At step 405, the method 400 includes providing the persistent USB service to the WSB host 101. Further, the method for providing the persistent USB service to the WSB host 101 is as described below.

In an embodiment, the method allows the WSB service layer 100*b* to receive the service ID in the seekService( ) primitive for the ASP layer 100*c* for providing the persistent USB service service to the WSB host 101.

Further, the ASP layer 100*c* receives the seekService( ) primitive from the WSB service layer 101*b* and starts discovering the WSB host 101 on P2P interface. In an embodiment, the P2P interface on the WSB client 100 receives a Probe Request from the WSB host 101 on P2P interface. The Probe request includes the service identifier along with the information of the created persistent P2P group.

The WSB client 100 receives the Probe request from the WSB host 101 and searches for the associated P2P group information along with the Service_ID. When the WSB client 100 determines the service_ID along with the persistent P2P group, the WSB host 100 responds to the probe request through a probe response.

In an embodiment, the ASP layer 100*c* on the WSB client 100 shall not perform service discovery. In an embodiment, the WSB service layer 100*b* on the WSB client 100 performs implicit authorization of the WSB host 101.

Further, the persistent connection is established between the WSB host 101 and the WSB client 100 through implicit authorization by the WSB client 100. The WSB service layer 100*b* on the WSB client 100 indicates the availability of persistent USB service to the WSB host 101. Further, the method 400 allows the WSB client 100 to provide the persistent USB service to the WSB host 101.

Further, the various actions, units, steps, blocks, or acts described in the method 400 can be performed in the order presented, in a different order, simultaneously, or a combination thereof. Furthermore, in some embodiments, some of the actions, units, steps, blocks, or acts listed in the FIG. 4 may be omitted.

FIG. 5 is a sequence diagram in which the WSB host provides a persistent service to the WSB client, according to the embodiments as disclosed herein. As depicted in the sequence diagram, the WSB service 101*b* on the WSB host 101 invokes (501) the SeekService( ) Primitive, which includes the service name to identify the service to be discovered. The WSB service 100*b* on the WSB client 100 advertises (501) to the ASP layer 100*c*. In the scenario, shown in figure, the service is associated with the WSB client 100 (for example, a USB peripheral). The ASP layer 101*c* starts (502) the discovery process for the WSB client 100 by sending a start discovery request to the P2P interface. Further, the ASP layer 100*c* in the WSB client 100 starts (502) starts the discovery process using the existing system as described herein.

The ASP layer 101*c* sends (503) the Probe Request which includes the service hash value as a part of device discovery. The ASP layer 100*c* in the WSB client 100 (also known as the advertiser) responds to the Probe Request based on the matched service hash, and sends the Probe Response with full service name. Further, the WSB service layer 101*b* on the WSB host 101 initiates the Service Discovery request, to obtain the detailed information about the USB service. The WSB client 100 responds to Service Discovery request that includes the USB device information, for example USB descriptors and so on. The ASP layer 101*c* events out the discovered information to the WSB service 101*b* using the SearchResult event.

The WSB service layer 101*b* initiates (504) the connection with that discovered WSB client 100 (the USB Peripheral or the Advertiser), using the newly defined Primitive, called ConnectPersistentSession( ). In an embodiment, the WSB service layer 101*b* can use the existing primitive ConnectSession(Persistent) with the new persistent flag to indicate the trigger of persistent connection with the WSB client 100.

When the ASP layer 101*c* receives the request for the connection with discovered WSB client 100 and also request for persistent connection, the ASP layer 101*c* (505) initiates the P2P connection between the WSB client 100 and the WSB host 101 by creating a persistent P2P group between the WSB host 101 and the WSB client 100. The ASP layer 101*c* (506) initiates the P2P connection between the WSB client 100 and the WSB host as shown in the FIG. 5.

In embodiment, the ASP layer 101*c* sends a Probe Discovery (PD) request message to initiate the service request. The PD request message includes the persistent connection request. Further, the ASP layer 101*c* also generates the unique Service_ID associated with the persistent connection. The unique Service_ID associated with the persistent connection is included in the PD request. The ASP layers (101*c* and 100*c* on the WSB host and the WSB client) continue to establish the connection and both the ASP layers (101*c* and 100*c*) maintain the P2P persistent group, associated with the service_ID exchanged during the PD request.

Once the connection is successfully initiated then, ASP layers (101*c* and 100*c*) event of the ConnectStatus event to WSB service 101*b* and 100*b* on the WSB client 100 and the WSB host 101. This event (ConnectStatus) includes the Service_ID value in which will be maintained by the WSB service 101*b* and 100*b* for future reference to the persistent USB connection. Further, the service_ID is used to map the service persistent information to P2P group persistency. Further, an ASP session is initiated (507) between the WSB host 101 and the WSB client 100.

In an embodiment, the MA USB enumeration is performed (508) between the WSB host 101 and the WSB client 100 after initiation of the ASP session. The WSB service 101*b* on the WSB host 101 stores (509) all the USB information, for example all the descriptors and the Service_ID associated with it. Further, the WSB service 101*b* on the WSB host 101 also informs the MA-USB stack to maintain the USB descriptors and USB address which is associated after the USB enumeration process.

The WSB service 100*b* on the WSB client 100 also stores (509) all the USB information and Service_ID associates with that USB session. Further, the WSB service 100*b* on the WSB client 100 also informs the MA-USB stack to maintain the USB address value that will be associated after the USB enumeration process. The ASP layers (101*c* and 100*c*) on the WSB client 100 and the WSB host 101 maintain (510) the service_ID along with the persistent data.

The WSB service layers (101*b* and 100*b*) maintain the association with the USB session (USB information) and the Service_ID. In an embodiment, there can be an interface between the WSB Service 101*b* and MA_USB stack (mainly the PAL layer). In an embodiment, the interface can store the associated information and also contains the information between the two layer to instruct the MA-USB for storing the USB descriptor and other required information.

In an embodiment, the MA-USB layer and WSB service layer can be a single entity on the WSB client 10 and the WSB host 101.

The USB data transfer starts (511) between the WSB host 101 and the WSB client 100 after the WSB service 100b and the WSB service 101b store all the USB information and Service_ID associates with that USB session.

When the WSB service need to resume the previously initiated connection and which is requested to be persistent, as instructed by the application, the WSB service 101b invokes (512) the new primitive action called SeekPersistentService(service_ID), which informs the ASP layer 101c that discovers (513) for the particular Persistent p2p group which is associated with that Service_ID.

The ASP layer 101c invokes (514) the Probe Request through P2P interface and searches for that particular P2P service. In an embodiment, the Probe Request includes the P2P group identifier and along with Service_ID. Further, the WSB host 100 has associated P2P group information stored and also the Service_ID which is matches, along with the service name. The ASP layer 100c on the WSB client 100 responds (515) with the Probe Response.

In an embodiment, the WSB Service 101b Invokes the existing primitive action called SeekSerivce(Service_ID) which includes the Service_ID newly defined attribute. The WSB service 101b informs the ASP layer that searches for the particular persistent P2P group which is associated with that Service_ID.

In an embodiment, the ASP layers (101c and 100c) ignores service discovery.

The WSB Service 101b on the WSB host 101 initiates (516) the connection by invoking the ConnectPeristentSession(Service_ID), which indicate the ASP layer 101c to start (517) the previous persistent connection (P2P group). Further, the ASP layer 100c on the WSB client 100 sends the ServiceRequest event which includes the Service_ID value to indicate the WSB host for invoking the WSB service.

The ASP layers (101c and 100c), continue (518) connection as per existing system in conjunction with the FIG. 5. Once the connection is established then ASP layers (101c and 100c) on the WSB client 100 and the WSB host 101 event out the ConnectStatus state variable to indicate (519) the success in the connection (ASP session) procedures. Further, the USB data transfer resumes (520) between the WSB host 101 and the WSB client 100.

FIG. 6 illustrates a computing environment implementing the method for configuring the WSB host and the WSB client for providing the persistent USB service, according to the embodiments as disclosed herein. As depicted in the computing environment 601 comprises at least one processing unit 604 that is equipped with a control unit 602 and an Arithmetic Logic Unit (ALU) 603, a memory 605, a storage unit 606, plurality of networking devices 608 and a plurality Input output (I/O) devices 607. The processing unit 604 is responsible for processing the instructions of the algorithm. The processing unit 604 receives commands from the control unit in order to perform its processing. Further, any logical and arithmetic operations involved in the execution of the instructions are computed with the help of the ALU 603.

The overall computing environment 601 can be composed of multiple homogeneous and/or heterogeneous cores, multiple CPUs of different kinds, special media and other accelerators. The processing unit 604 is responsible for processing the instructions of the algorithm. Further, the plurality of processing units 604 may be located on a single chip or over multiple chips.

The algorithm comprising of instructions and codes required for the implementation are stored in either the memory unit 605 or the storage 606 or both. At the time of execution, the instructions may be fetched from the corresponding memory 605 and/or storage 606, and executed by the processing unit 604.

In case of any hardware implementations various networking devices 608 or external I/O devices 607 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1, 2, 5 and 6 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for configuring a Wireless Serial Bus (WSB) host for obtaining a persistent Universal Serial Bus (USB) service from a WSB client, the method comprising:
    discovering the WSB client by an Application Service Platform (ASP) layer in the WSB host;
    receiving a request for a persistent USB connection with the WSB client from an application in the WSB host;
    requesting a persistent Peer-to-Peer (P2P) group for the persistent USB connection with the WSB client by the ASP layer, wherein the ASP layer initiates the persistent USB connection by creating the persistent P2P group between the WSB host and the WSB client;
    mapping the created persistent P2P group with a persistent USB service based on a service identifier that identifies the persistent USB service, wherein the service identifier is assigned to the persistent USB connection and the service identifier is mapped to a group identifier identifying the created persistent P2P group, by the ASP layer;
    transmitting, to the WSB client, the service identifier; and
    obtaining the persistent USB service, identified from the transmitted service identifier, from the WSB client after storing the service identifier mapped with the group identifier identifying the created persistent P2P group and the persistent USB connection.

2. The method of claim 1, wherein the request comprises a ConnectSession with a parameter, wherein the parameter indicates the WSB host to initiate a persistent USB connection.

3. The method of claim 1, wherein obtaining the persistent USB service from the WSB client comprises:
  discovering the persistent USB service in the WSB client;
  sending a ServiceRequest Event to the WSB client, wherein the ServiceRequest Event comprises the service identifier; and
  initiating the persistent USB connection with the WSB client for obtaining the persistent USB service from the WSB client.

4. The method of claim 3, wherein the discovering the persistent USB service in the WSB client comprises:
  sending a Probe Request with the service identifier associated with the persistent USB connection and information of the created persistent P2P group; and
  receiving a Probe Response from the WSB client when the persistent USB service is available in the WSB client.

5. A method for configuring Wireless Serial Bus (WSB) client for providing a persistent Universal Serial Bus (USB) service to a WSB host, wherein the method comprising:
  receiving a request for a persistent USB connection from the WSB host;
  creating a persistent Peer-to-Peer (P2P) group for the persistent USB connection with the WSB host initiated by an Application Service Platform (ASP) layer;
  receiving a service identifier associated with the persistent USB connection and a group identifier identifying the created persistent P2P group from the WSB host, the service identifier identifying the persistent USB service;
  storing the service identifier associated with the group identifier identifying the created persistent P2P group and the persistent USB connection; and
  providing the persistent USB service, identified from the received service identifier, to the WSB host.

6. The method of claim 5, wherein providing the persistent USB service to the WSB host comprises:
  receiving a Probe Request from the WSB host, wherein the Probe Request comprises service identifier for the persistent USB connection and information of the created persistent P2P group; and
  generating a Probe Response to the WSB host when the persistent USB service is available.

7. The method of claim 6, wherein generating the Probe Response to the WSB host comprises:
  searching the service identifier associated with the persistent USB connection and the information of the created persistent P2P group, received in the Probe Request;
  determining a match between the information of the created persistent P2P group, the service identifier and the stored service identifier associated with the created persistent P2P group; and
  responding to the Probe Request through a Probe Response in response to determining the match receiving a service identifier associated with the persistent USB connection and the created persistent P2P group from the WSB host; and
  providing the persistent USB service to the WSB host after storing the service identifier associated with the created persistent P2P group and the persistent USB connection.

8. The method of claim 6, wherein providing the persistent USB service to the WSB host comprises:
  sending a probe request by a P2P layer in the WSB client, wherein the probe request comprises an identifier of the created persistent P2P group along with the service identifier associated with the created persistent P2P group.

9. The method of claim 6, wherein providing the persistent USB service to the WSB host comprises:
  generate a probe response for the probe request, when the identifier of the created persistent P2P group along with the service identifier is matched with the stored the service identifier along with the created persistent P2P group in the WSB host.

10. The method of claim 6, wherein providing the persistent USB service to the WSB host comprises:
  invoking a connect persistent session with the service identifier, wherein the connect persistent session indicates the ASP layer of the WSB host to initiate the persistent USB connection for providing the persistent USB service to the WSB host.

11. A Wireless Serial Bus (WSB) host for obtaining a persistent Universal Serial Bus (USB) service from a WSB client, wherein the WSB host comprises a Media Agnostic USB (MA USB) layer, a WSB layer and an Application Service Platform (ASP) layer along with:
  an integrated circuit further comprising at least one processor;
  at least one memory having a computer program code within the circuit;
  the at least one memory and the computer program code with the at least one processor cause the WSB host to:
  discover the WSB client by an ASP layer in the WSB host;
  receive a request for a persistent USB connection with the WSB client from an application in the WSB Host;
  request a persistent Peer-to-Peer (P2P) group for the persistent USB connection with the WSB client by the ASP layer, wherein the ASP layer initiates the persistent USB connection by creating the persistent P2P group between the WSB host and the WSB client;
  map the created persistent P2P group with a persistent USB service based on a service identifier that identifies the persistent USB service, wherein the service identifier is assigned to the persistent USB connection and the service identifier is mapped to a group identifier identifying the created persistent P2P group by the ASP layer;
  transmit, to the WSB client, the service identifier; and
  obtain the persistent USB service, identified from the transmitted service identifier, from the WSB client, after storing the service identifier mapped with the group identifier identifying the created persistent P2P group and the persistent USB connection.

12. The WSB host of claim 11, wherein the request comprises a connect session with a parameter, wherein the parameter indicates the WSB host to initiate a persistent USB connection.

13. The WSB host of claim 11, wherein the at least one processor causes the WSB host to:
  obtain the persistent USB service from the WSB client comprises:
  discover the persistent USB service in the WSB client;
  send a service request event to the WSB client, wherein the service request event comprises the service identifier; and
  initiate the persistent USB connection with the WSB client for obtaining the persistent USB service from the WSB client.

14. The WSB host of claim 13, wherein the at least one processor causes the WSB host to:

send a Probe Request with a service identifier associated with the persistent USB connection and information of the created persistent P2P group; and receive a Probe Response from a WSB client when the persistent USB service is available in the WSB client.

15. A Wireless Serial Bus (WSB) client for providing a persistent Universal Serial Bus (USB) service to a WSB host, wherein the WSB client comprises a Media Agnostic USB (MA USB) layer, a WSB layer and an application service platform (ASP) layer along with:

an integrated circuit further comprising at least one processor; and at least one memory having a computer program code within the circuit;

wherein the at least one memory and the computer program code with the at least one processor cause the WSB client to:

receive a request for a persistent USB connection from the WSB host;

create a persistent peer-to-peer (P2P) group for the persistent USB connection with the WSB host initiated by an ASP layer;

receive a service identifier associated with the persistent USB connection and a group identifier identifying the created persistent P2P group from the WSB host, the service identifier identifying the persistent USB service;

store the service identifier associated with the group identifier identifying the created persistent P2P group and the persistent USB connection; and provide the persistent USB service, identified from the received service identifier, to the WSB host.

16. The WSB host of claim 15, wherein the at least one processor causes the WSB client to:

receive a Probe Request from the WSB host, wherein the Probe Request comprises service identifier for the persistent USB connection and information of the created persistent P2P group; and generate a Probe Response to the WSB host when the persistent USB service is available.

17. The WSB host of claim 16, wherein the at least one processor causes the WSB client to:

search the service identifier associated with the persistent USB connection and the information of the created persistent P2P group, received in the Probe Request;

determine a match between the information of the created persistent P2P group, the service identifier and the stored service identifier associated with the created persistent P2P group; and respond to the Probe Request through a Probe Response in response to determining the match receiving a service identifier associated with the persistent USB connection and the created persistent P2P group from the WSB host; and provide the persistent USB service to the WSB host after storing the service identifier associated with the created persistent P2P group and the persistent USB connection.

18. The WSB host of claim 16, wherein the at least one processor causes the WSB client to:

send a Probe Request by a P2P layer in the WSB client, wherein the Probe Request comprises an identifier of the created persistent P2P group along with the service identifier associated with the created persistent P2P group.

19. The WSB host of claim 16, wherein the at least one processor causes the WSB client to:

generate a Probe Response for the Probe Request, when the identifier of the created persistent P2P group along with the service identifier is matched with the stored the service identifier along with the created persistent P2P group in the WSB host.

20. The WSB host of claim 16, wherein the at least one processor causes the WSB client to:

invoke a ConnectPersistentSession with the service identifier, wherein the ConnectPersistentSession indicates the ASP layer of the WSB host to initiate the persistent USB connection for providing the persistent USB service to the WSB host.

* * * * *